United States Patent [19]
Murphy et al.

[11] Patent Number: 5,816,540
[45] Date of Patent: Oct. 6, 1998

[54] OPTIMAL SOLAR TRACKING SYSTEM

[75] Inventors: John R. Murphy, El Segundo; Ross Crowley, Torrance, both of Calif.

[73] Assignee: Hughes Electronics, Los Angeles, Calif.

[21] Appl. No.: 577,436

[22] Filed: Dec. 22, 1995

[51] Int. Cl.$^6$ .................................................. B64G 1/24
[52] U.S. Cl. .......................... 244/173; 244/171; 244/164
[58] Field of Search .................................... 244/171, 173, 244/168, 164

[56] References Cited

U.S. PATENT DOCUMENTS

| | | | |
|---|---|---|---|
| 4,426,052 | 1/1984 | Hubert et al. | 244/173 |
| 4,591,116 | 5/1986 | Guenther et al. | 244/173 |
| 5,305,971 | 4/1994 | Decanini | 244/173 |
| 5,310,144 | 5/1994 | Salvatore et al. | 244/168 |
| 5,337,981 | 8/1994 | Bender | 244/164 |

FOREIGN PATENT DOCUMENTS 544241  11/1992  European Pat. Off. ............... 244/164

Primary Examiner—Andres Kashnikow
Assistant Examiner—Tien Dinh
Attorney, Agent, or Firm—Terje Gudmestad; Wanda K. Denson-Low; Elizabeth E. Leitereg

[57] ABSTRACT

A spacecraft traveling in a volume of space receiving radiation from the sun and encountering an undesired force. The spacecraft has a solar panel movably attached to said spacecraft. The spacecraft further includes a solar panel controller which controls the movement of the solar panel, wherein the controller moves the solar panel in a time modulated manner so that a torque is generated which compensates for the undesired force.

20 Claims, 5 Drawing Sheets

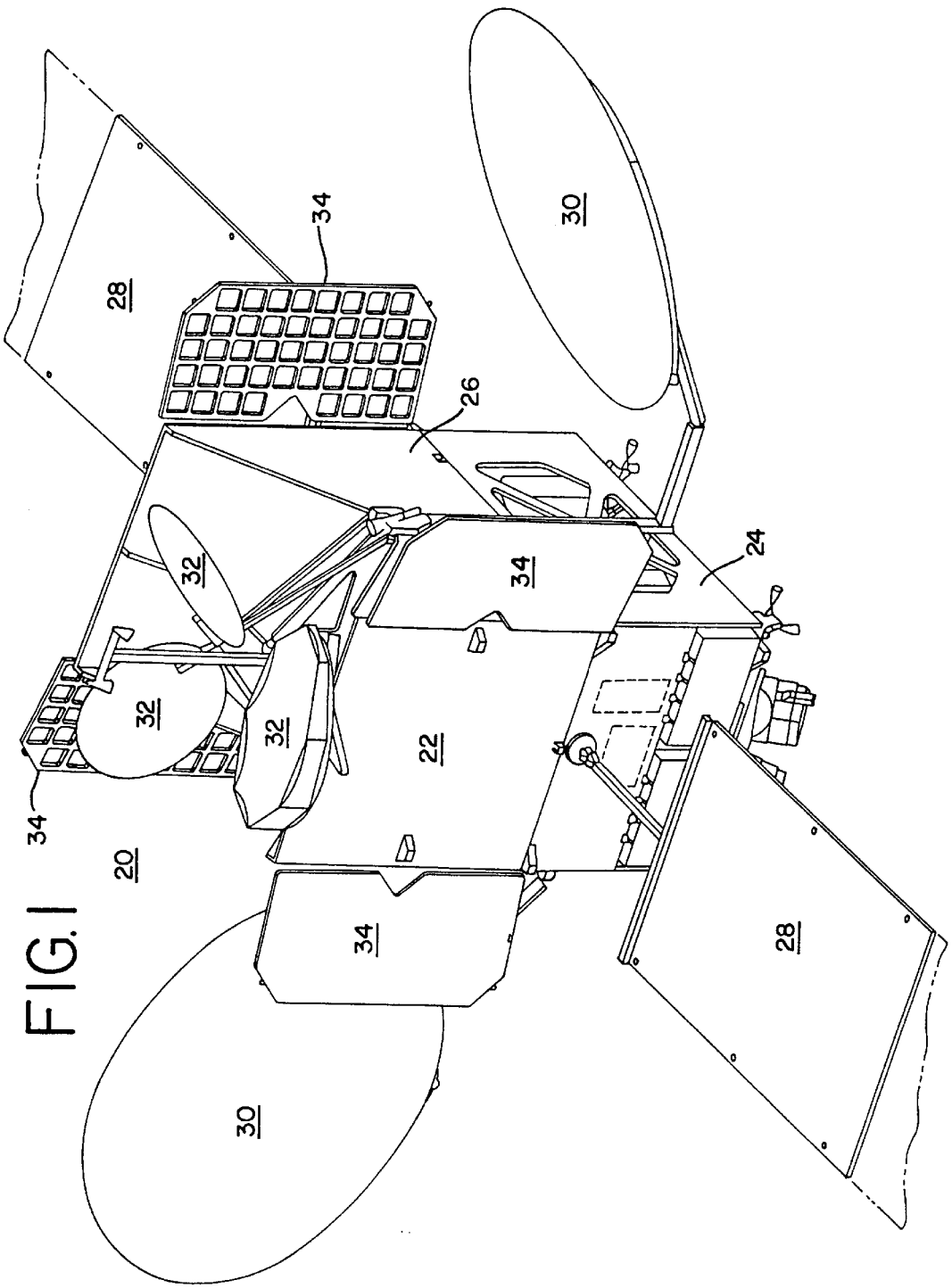

TIMELINE FOR "TIME WEIGHTED" AVERAGE:
"TIME @ PT. O"   "TIME @ PT. E"

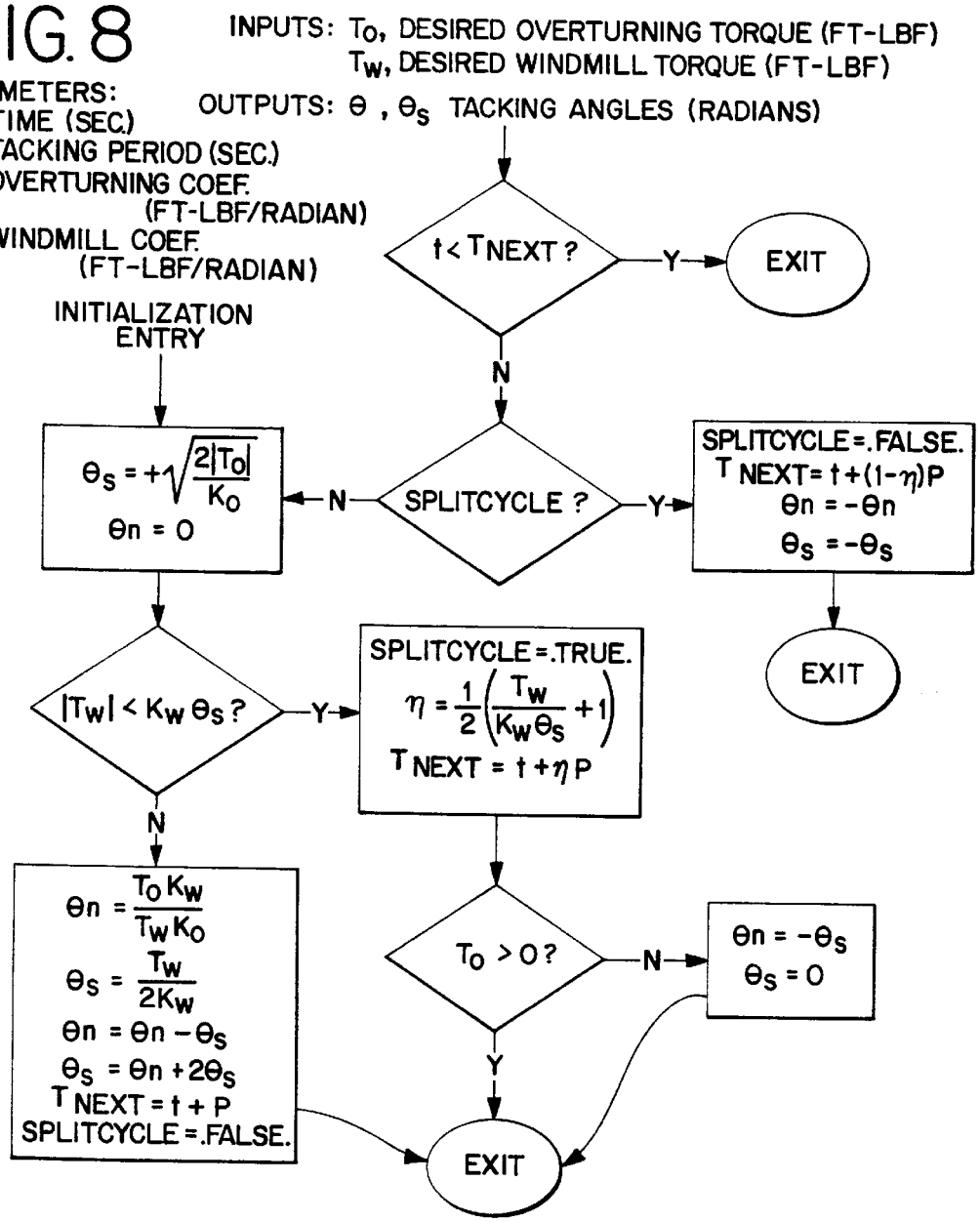
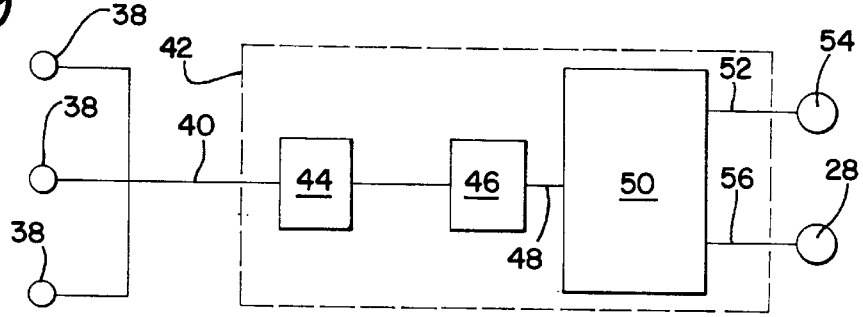

OPTIMAL SOLAR TRACKING SYSTEM

BACKGROUND OF THE INVENTION

In the past, spacecraft, such as satellites, have used solar panels to stabilize the spacecraft against undesired influences or torques from solar pressure or other attitude disturbances. Stabilization is accomplished by a process called solar tacking where the solar panels are rotated away from their nominal, sun-line normal position, to a position where the undesired influences or torques are reduced or canceled by torques generated by solar pressure acting on the solar panels. In theory, the solar panels are rotated so that the solar radiation impinging on the panels will produce an overturning torque and windmill torque upon the spacecraft. As is well known in the art, a windmill torque causes the spacecraft to rotate about an axis which is perpendicular to the axis of rotation of the solar panels. In addition, an overturning torque is known to be a torque that causes the spacecraft to rotate about an axis that is orthogonal to both the axis of rotation of the solar panels and the axis of rotation defined by the windmill torque. An overturning torque is the result of the projected area of the solar wing or panel with respect to the sun-line. When only one panel is rotated about pitch (i.e. the solar panel axis of rotation) a windmill torque is produced and so is an overturning torque. The panel that is rotated will have a smaller projected area than the one that is left unrotated ($\theta=0°$), and therefore, the spacecraft will be affected by an overturning torque.

Previously, satellites used amplitude modulation when tacking. FIG. 3 shows a plot illustrating the combination of instantaneous windmill and overturning torques for various constant levels of power loss due solely to the associated tack angles for a generic 3-axis stabilized, dual solar panel satellite. The hour glass area indicates all possible instantaneous torque combinations which can be generated by solar tacking without incurring power losses of greater than 8.5%. In an amplitude modulated scheme, such as described in U.S. Pat. No. 4,949,922 to Rosen, if the torque combination required falls inside the "neck" of the hour glass, then a pair of instantaneous tack conditions within the hour glass are employed. This technique is also shown in FIG. 3. The desired torque combination is denoted by C. A pair of tacking maneuvers are performed which produce torque combinations A and B located in the hour glass area and which when averaged will result in torque combination C.

One method of tacking is described in U.S. Pat. No. 4,325,124 to Renner. The Renner patent discloses a method of tacking which involves rotating only one panel at a time to a predetermined pitch offset angle. This method has several disadvantages. First, it can produce undesirable windmill torques which limit a satellite's ability to maintain its pointing. At the same time, the tack angles indicated by the method disclosed in the Renner patent generate high energy losses for most modern communication satellite configurations, where power is a premium, and are often based on pointing errors rather than on estimates of disturbance torques affecting the spacecraft.

Current methods of solar tacking overcome the limitations of the Renner patent by employing a technique of amplitude modulation where the solar panels are rotated to desired positions for a fixed amount of time or half cycle to produce needed control torques. After the half cycle is complete, the solar panels are rotated to another position for the same fixed amount of time or half cycle. Tacking is performed whether the tacking is needed or not. An example of this technique is described in U.S. Pat. No. 4,949,922 to Rosen. In the Rosen patent, both solar panels are rotated in response to a disturbance torque estimate.

While prior tacking methods have performed adequately to reduce undesired influences, there are, of course, still areas that could be improved. For example, prior tacking methods produce large power losses due to the large solar tacking angles employed that reduce the amount of solar energy generated by the solar panels. In other words, prior tacking methods inefficiently balance the need for torque in view of the need for reducing solar panel energy losses. Thus, optimizing a tacking method involves balancing the reduction of disturbances with power losses.

SUMMARY OF THE INVENTION

The present invention provides a solar panel control system for a spacecraft which compensates for unwanted disturbances exerted on the spacecraft. In particular, a solar panel control system constructed in accordance with the teachings of the present invention provides a time modulated solar tacking scheme which increases the power efficiency of solar tacking without sacrificing the ability to generate torque.

The present invention concerns a spacecraft traveling in a volume of space receiving radiation from the sun. The spacecraft has a solar panel and a sensor measuring an undesired force exerted on the spacecraft and generating a signal representing the undesired forces. The spacecraft further includes an evaluator which receives the signal and calculates from the signal a torque to be applied to the spacecraft necessary to compensate for the undesired forces. A comparator generates a comparator signal indicative of whether the torque is within a predetermined range. The spacecraft includes a solar panel controller which receives the comparator signal, wherein if said comparator signal indicates that the torque is within the predetermined range, then the torque is applied to the spacecraft by moving the solar panel to a position relative to the radiation for a fixed period P. If the comparator signal indicates that the torque is outside the predetermined range, then the torque is applied to the spacecraft by tacking the solar panel between at least two different positions relative to the received radiation during the fixed period P.

The present invention also provides a method of compensating for an undesired force exerted on a spacecraft traveling in a volume of space which has a solar panel receiving radiation from the sun. The method entails measuring the undesired force exerted on the spacecraft and determining from the measured undesired force a torque to be applied to the spacecraft necessary to compensate for the undesired force. The determined torque is compared with a predetermined range. The determined torque is applied to the spacecraft by moving the solar panel to a position relative to the radiation for a fixed period P, if the torque is within the predetermined range. The determined torque is applied the spacecraft by tacking the solar panel between at least two different positions relative to the received radiation during the fixed period P, if the torque is outside the range.

A spacecraft traveling in a volume of space receiving radiation from the sun and encountering an undesired force is also disclosed. The spacecraft has a solar panel movably attached to said spacecraft. The spacecraft further includes a solar panel controller which controls the movement of the solar panel, wherein the controller moves the solar panel in a time modulated manner so that a torque is generated which compensates for the undesired force.

Additionally, the present invention provides a method of compensating for an undesired force exerted on a spacecraft traveling in a volume of space which has a solar panel receiving radiation from the sun. The method entails moving the solar panel relative to the spacecraft and moving the solar panel in a time modulated manner so that a torque is generated which compensates for the undesired force.

Thus, the above-described solar panel control system of the present invention efficiently produces tacking torques with lower solar panel energy losses when compared with an amplitude modulated tacking system.

The foregoing features and advantages of the present invention will be further understood upon consideration of the following detailed description of the invention taken in conjunction with the accompanying drawings, in which:

BRIEF DESCRIPTION OF THE DRAWINGS

FIG. 1 shows a spacecraft using the tacking system and method according to the present invention;

FIG. 8 shows a flow chart for the time modulation tacking system and method according to the present invention; and FIG. 9 shows a solar panel control system implementing the flow chart of FIG. 8.

DESCRIPTION OF THE PREFERRED EMBODIMENT

Figure 2A:
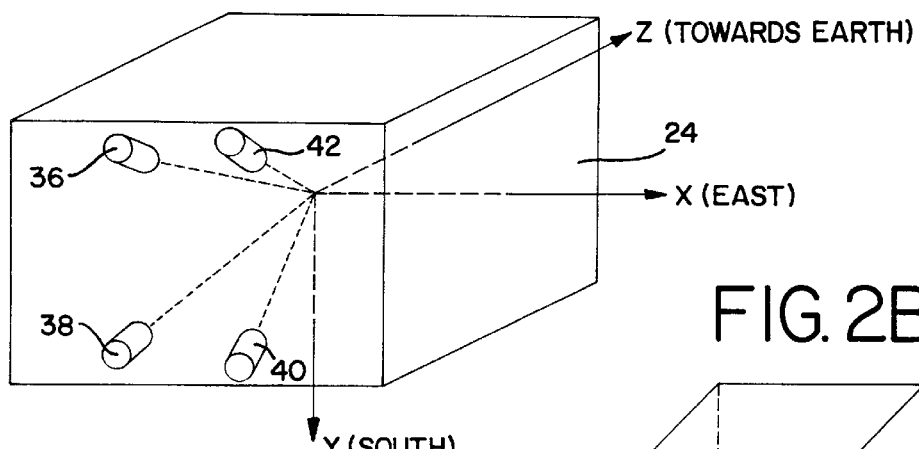
FIG. 2A shows a electronic thruster configuration for the spacecraft of FIG. 1.
Figure 2B:
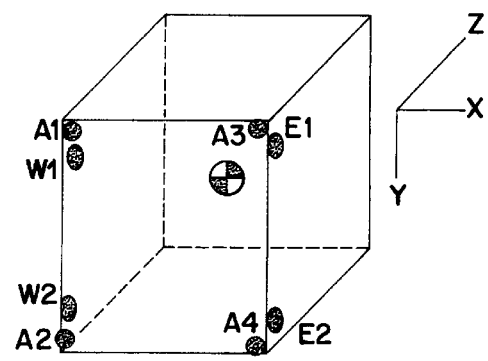
FIG. 2B shows a chemical thruster configuration for the spacecraft of FIG. 1.

A spacecraft or satellite 20 according to the present invention is shown in FIGS. 1 and 2. In particular, a spacecraft or satellite 20 is shown in FIG. 1 which is designed for traveling in a volume of outer space, such as an orbital path around the earth. Satellite 20 has a spacecraft body 22 which includes a lower bus module 24 and an upper payload module 26. Attached to the aft end of the lower bus module 24 are a plurality of engines which will be discussed in detail later. Lower bus module 24 contains fuel tanks (not shown) and various power and control modules which operate the engines and power the payload module 26. Bus module 24 further includes a pair of solar panels 28 which convert sunlight into electricity which is sent to batteries (not shown) located in the bus module 24. Bus module 24 also has one or more antennae 30 and reflectors 32 which receive signals from a ground station on earth which are used to control and monitor the satellite. Antennae and reflectors 30 and 32, respectively, also send signals to the ground station.

Payload module 26 is attached to the bus module 24 and contains a variety of electronic equipment which may contain a number of sensors (not shown). The electronic equipment processes information gathered by the sensors and sends the processed information back to the ground station via antennae 30. Payload module 26 further includes heat radiators 34 which emit heat generated by the spacecraft 20. As shown in FIG. 2, the spacecraft 20 preferably has eight chemical thrusters, such as monopropellant and bipropellant propulsion thrusters 36 attached to the spacecraft body 22, pointing away from the earth. It is also envisioned to use electronic thrusters to control the spacecraft 20.

Besides thrusters 36, the spacecraft body 22 also may have a variety of electronic packages on board which require large amounts of electrical energy, such as scientific experimental packages, sensors or communications antennae 30. Such electronic packages and electronic thrusters 36 need to be fed electrical power. Since the spacecraft 20 will be within sight of the sun, two or more radiation receiving elements, such as solar panels 28, are deployed to receive radiation from the sun. The solar panels 28 convert the radiation from the sun into electricity in a well known manner and the electricity is distributed to the electronic components on the spacecraft body 22.

The spacecraft 20 will often encounter undesired forces and torques while moving in its orbit. These undesired forces and torques are generated in various ways, such as solar wind or communication radiation imbalance which occurs when the amount of radiation absorbed by the communication reflectors 30 does not equal the amount of radiation reflected off of the solar panels. The magnitude of these disturbance torques varies from spacecraft to spacecraft. The spacecraft 20 has one or more sensors 38 that are used to estimate in a well known manner any undesired torques exerted on the spacecraft 20. Sensor 38 is of a well known type, such as a gyroscope or pointing sensor, and generates in a well known manner a signal 40 representing the undesired forces encountered by the spacecraft 20. In the case of a gyroscope, the sensor 38 provides information about the rates at which the spacecraft 20 is moving and rotating. A pointing sensor provide information about the spacecraft's attitude and can also be used to estimate the rates of motion or rotation of the spacecraft 20. Note that the detected undesired forces may be compensated for by a well known momentum accumulator. The knowledge of the amount of and rate of momentum stored on the momentum accumulator can also be used to estimate the disturbances.

As shown in FIG. 9, signal 40 is sent to a solar panel control system 42 (dashed lines) which can comprise one or more microprocessors to control the angles of the solar panels 28 in accordance with the tacking system and method described below. In general, solar panel control system 42 includes an evaluator 44 which calculates from signal 40 a torque to be applied to the spacecraft 20 which is necessary to compensate for the undesired forces detected by sensor 38. Evaluator 44 takes into account the dynamics of spacecraft 20 when calculating the torque. A signal representative of the torque is then sent to a comparator 46 which generates a comparator signal 48 indicative of whether the torque is within a predetermined range. The predetermined range is defined to be those torques which would produce a power loss from the solar panels which is below an acceptable level, such as 8.5%.

Note that if the power loss is greater than the acceptable level, then the angles could be limited by, perhaps, the solar wing drive controller or some power controller. However, such a calculation would be difficult to perform and is outside the scope of the present invention.

Comparator signal 48 is sent to a solar panel controller 50. The controller 50 recognizes whether or not comparator signal 48 is within the predetermined range. Controller 50 then sends a control signal 52 to the solar panels 28 so that they move and generate a torque. Operation of controller 50 is discussed below with respect to the flow chart of FIG. 8.

Figure 5:
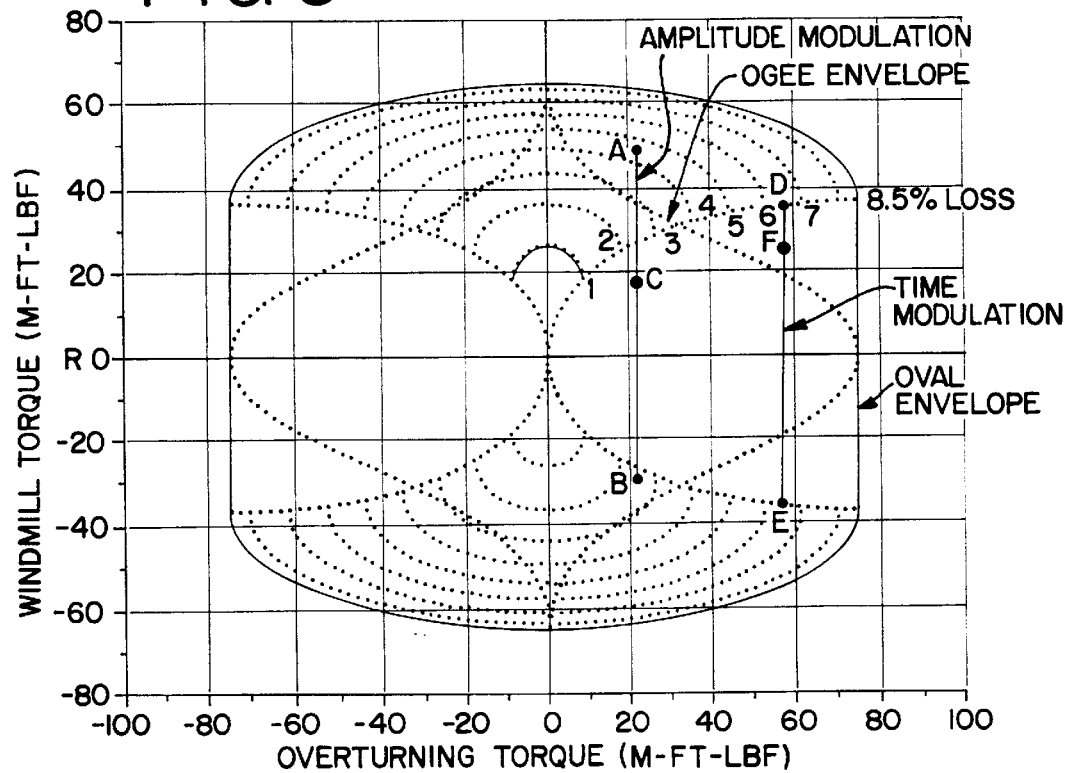
FIG. 5 shows a comparison of control authority envelopes for amplitude and time modulation when power loss levels are limited between 0–8.5%.
Figure 6A:
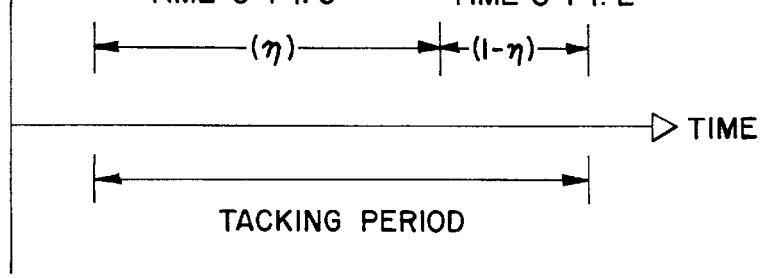
FIGS. 6A and 6B graphically show a time modulation solar tacking method of the present invention.
Figure 6B:
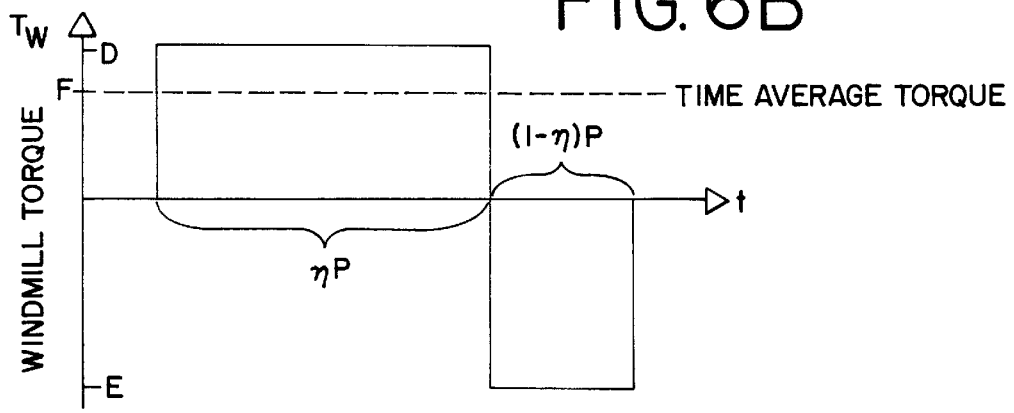
Figure 7:
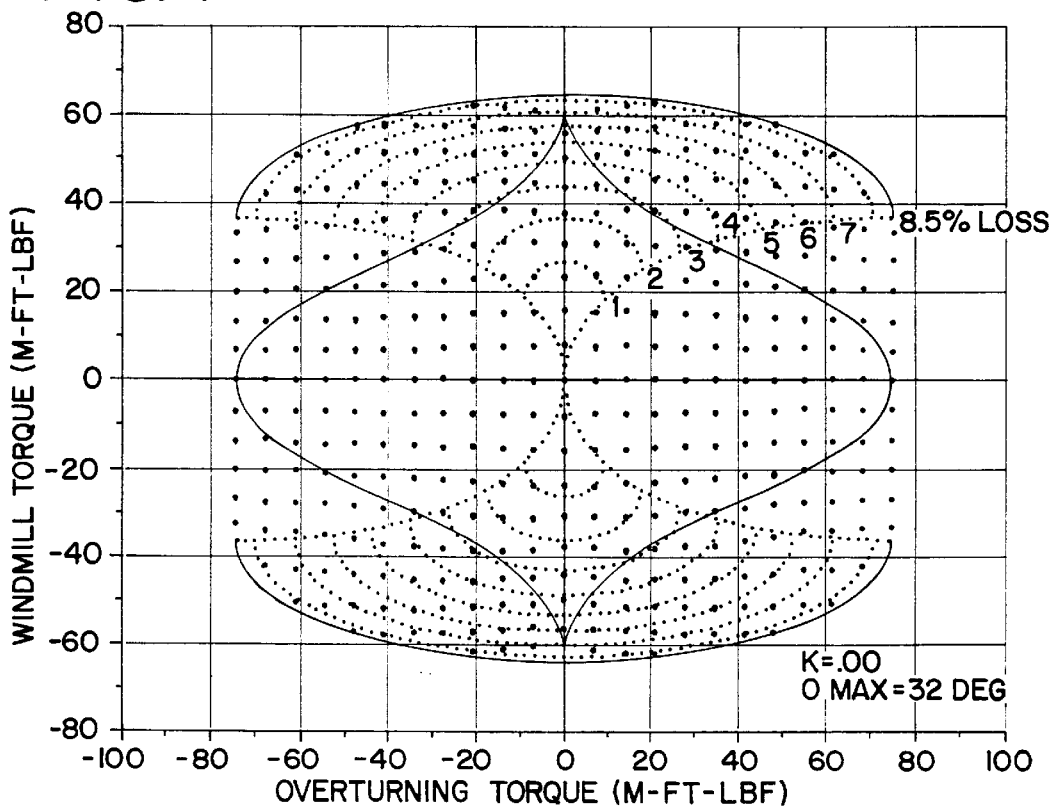
FIG. 7 shows the control limits for the time modulation system and method according to the present invention.

In contrast to prior sun tacking systems, the present invention generates the requested torques by modulating the time spent in a tack angle configuration rather than modulating the amplitudes of the tack angles themselves. In other words, instead of only rotating the solar panel 28 after a fixed half cycle, the solar panels 28 are rotated after a varying duration of the half cycle. FIGS. 5–7 are instructive of a time modulation tacking method according to the present invention. If it is determined that the required set of torques (i.e. the desired/commanded windmill and overturning torques) for counteracting the undesired disturbances or for dumping momentum is at a single point within the hourglass shape of FIG. 5, then only one tack angle state is required. If the on-board processor requests one of these tack angle states, the solar panels 28 are rotated to the associated tack angles, $\theta_n$ and $\theta_s$, which represent that point, and are held there for the entire tack period, P.

FIG. 5 also demonstrates the case when it has been determined that a combination of torques represented by point F are needed to compensate for an undesired force on the spacecraft. If amplitude modulation were used, power losses of over 8.5% would occur since point F is outside of the amplitude modulation envelope for states that produce power losses less than 8.5%. However, time modulated tacking can compensate for the undesired torque while incurring power losses of less than 8.5%. This is accomplished by extending a vertical line representing constant overturning torque through point F and determining where the line intersects the boundary of the hour glass shaped envelope. In this example, those two points are D and E. Those two points determine two torque states which are combined to produce a requested torque on the spacecraft. A torque state is defined to be the angles of both of both of the solar panels 28. Typically, for each torque state one of the solar panels 28 has a torque angle of 0° in order to limit power losses. Of course, both solar panels 28 can be tacked according to the present invention. Note that the desired points representing the determined torque states will be on the edge of the hour glass shape since if the line is extended further inside the hour glass, the torques determined at the end of the line will have greater power losses than those on the edge. Once points D and E are determined, the next step is to determine modulation half cycle times, $t_1$ and $t_2$, in which the two torque states corresponding to points D and E, respectively, are generated by the solar panels 28 in order to produce the requested state F torques. The tacking period is a constant, usually two to four hours. The percentage of the time torques D and E will be applied during the tacking period is determined based on the windmill torque which needs to be produced. These percentages may well be unequal as shown in FIGS. 6A and 6B. In amplitude modulated tacking, the percentages would be equal—50% for both torques.

Calculation of the tacking times for the windmill torques represented by points D and E is performed as follows: Since the half cycle times for performing the torques represented by points D and E are designated by $t_1$ and $t_2$, respectively, it follows that P=total tacking period or cycle=$t_1+t_2$. P typically has a value ranging from two to four hours. As an example, the torque represented by point F in FIG. 5 is a combination of an overturning torque of 58 $\mu$ft-lbf and a windmill torque of 25 $\mu$ft-lbf. Since the torques at points D and E both produce an overturning torque of 58 $\mu$ft-lbf, the average overturning torque produced by a combination of the torques at points D and E performed during a tack cycle will be 58 $\mu$ft-lbf. However, the windmill torques represented by points D and E have values of +38 $\mu$ft-lbf and −38 $\mu$ft-lbf, respectively. Assuming the tack period, P, is 20 minutes, then solar panels 28 must be rotated to angles that will generate the torque corresponding to point D for approximately 16.6 minutes and then the solar panels 28 are rotated to an angle to generate the torque represented by point E for only 3.4 minutes. Of course, points above point D and below point E could be chosen, but they would suffer from greater power losses than those points actually on the hour-glass envelope edge.

The governing equations for determining the windmill and overturning torques $T_w$, $T_o$, respectively are the transcendental equations that can be derived from the discussion given on pages 570–573 of "Spacecraft Attitude Determination and Control" by the Technical Staff Attitude Systems Operation of Computer Sciences Corporation and published in 1978 by Kluwer Academic Publishers. The equations are given below:

$$T_o = h[(\rho A_n \cos \epsilon \cos \theta_n)\cos \epsilon (1-v_s) + 2 \cos \theta_n (v_s \cos \epsilon \cos \theta_n + \tfrac{1}{3} v_d)) - (\rho A_s \cos \epsilon \cos \theta_s)(\cos \epsilon (1-v_s) + 2 \cos \theta_s (v_s \cos \epsilon \cos \theta_s + \tfrac{1}{3} v]$$

$$T_w = h[(\rho A_n \cos \epsilon \cos \theta_n)(2 \sin \theta_n (v_s \cos \epsilon \cos \theta_n + \tfrac{1}{3} v_d)) - (\rho A_s \cos \epsilon \cos \theta_s)(2 \sin \theta_s (v_s \cos \epsilon \cos \theta_s + \tfrac{1}{3} v_d))]$$

where
  h=the moment arm of each wing as measured from the center of mass of the spacecraft to the center of pressure for each wing;
  $\rho$=solar flux constant;
  $A_n$=area of north wing;
  $A_s$=area of south wing;
  $\epsilon$=inclination of the sun relative to the spacecraft;
  $\theta_n$=tack angle for north wing;
  $\theta_s$=tack angle for south wing;
  $v_s$=specular coefficient; and
  $v_d$=diffusion coefficient.

Theoretically, once the disturbance torques are broken down into windmill and overturning torques, the transcendental equations can be solved for the tacking angles $\theta_n$ and $\theta_s$ for the north and south panels, respectively. Fortunately, approximations for the tacking windmill and overturning torques $T_w$, $T_o$, respectively, are available and are given by:

$$T_w = K_w(\theta_s - \theta_n)$$

$$T_o = \frac{K_o}{2}[\theta_s^2 - \theta_n^2]$$

$\theta_s$ and $\theta_n$ are the tacking angles for the south and north solar panels 28, respectively, relative to the axis of rotation of the panels 28. Note that a north solar panel extends from the spacecraft in a northern direction as defined by the orbital plane of the spacecraft, as north is defined on Earth. Similarly, a south panel points in a southern direction as defined by the orbital plane. In addition, $K_w$ and $K_o$ represent various solar constants, such as solar flux and several properties of the solar panels 28 themselves.

By definition, an optimal tack occurs when the plane of one of the solar panels, say the north solar panel, is perpendicular to the sun vector so that $\theta_n$=0. Thus, the windmill and overturning torques are given by:

$$T_w = K_w \theta_s$$

$$T_o = K_o \theta_s^2 / 2$$

Since the hour glass shape is symmetric about the overturning axis, the values of the windmill torques at points D and E are equal in magnitude, $\theta_s$, but opposite in sign. So, the windmill torques $T_w^D$, $T_w^E$ produced at points D and E, respectively, are calculated below:

$$T_w^D = K_w \theta_s \text{ and } T_w^E = K_w(-\theta_s)$$

As mentioned above, the torque, $T_w^F$, generated at point F will be a combination of the torques $T_w^D$ and $T_w^E$ alternatively applied over tacking period, P. Expressed in another way:

$$T_w^F P = T_w^D t_1 + T_w^E t_2, \text{ where } P = t_1 + t_2$$

Let $\eta = t_1 P$ = the proportion of time during period P that the solar panel is tacked to $\theta_s$ or at state D. It follows that:

$$\eta = \frac{1}{2} \left[ \frac{T_w^F}{K_w \theta_s} + 1 \right]$$

The weighted average of the two tacking torques is graphically shown in FIGS. 6A–B. Note that the overturning torques are constant for each state.

With the above-description in mind, tacking of the solar panels is accomplished by first dividing up the 24 hour day into multiple periods or cycles, P, of equal magnitude. At the start of a period P, the spacecraft 20 measures the disturbance torques exerted on the spacecraft 20. The spacecraft 20 then calculates the combination of windmill and overturning torques, $T_w$, $T_o$, respectively, necessary to counteract the measured disturbance torque. The spacecraft 20 also initializes the algorithm by setting the values of $\theta_s$ and $\theta_n$ to be as follows:

$$\theta_s = \sqrt{\frac{2|T_o|}{K_o}} \; ; \theta_n = 0.$$

$\theta_n$ is assumed to be zero just to initialize the algorithm. The decision as to whether $\theta_n$ or $\theta_s$ is equal to zero is based entirely on the sign of the overturning torque. If the overturning torque is positive then $\theta_n$ is initially set equal to zero, if the overturning torque is negative than $\theta_s$ is equal to zero.

Figure 3:
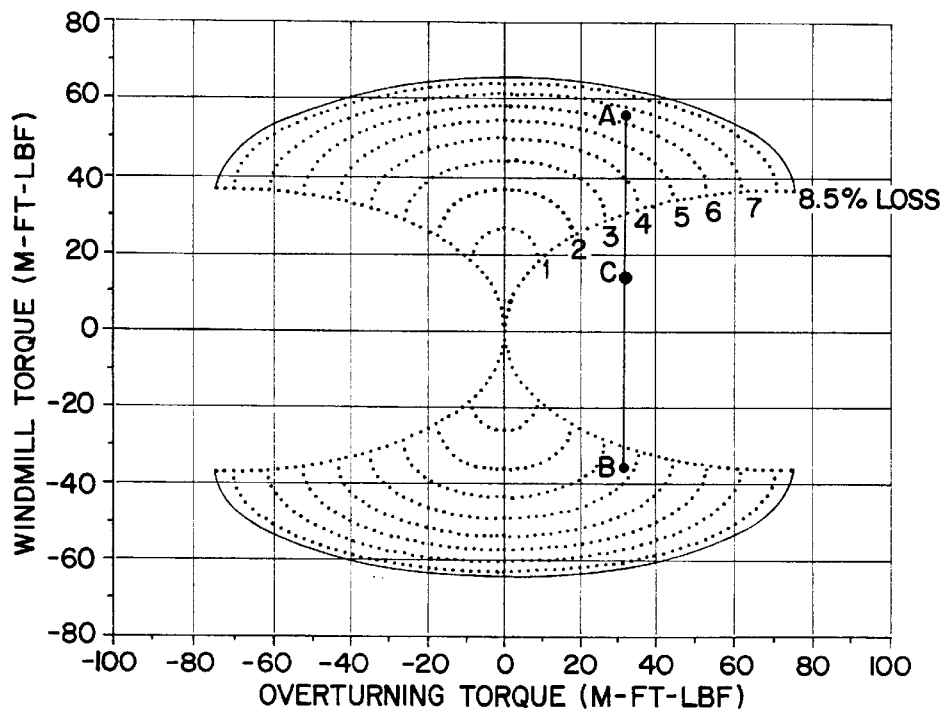
FIG. 3 shows a plot of instantaneous windmill torque vs. overturning torque when power loss levels are limited between 0–8.5% at solstice for a three-axis stabilized, dual solar panel satellite.
Figure 4:
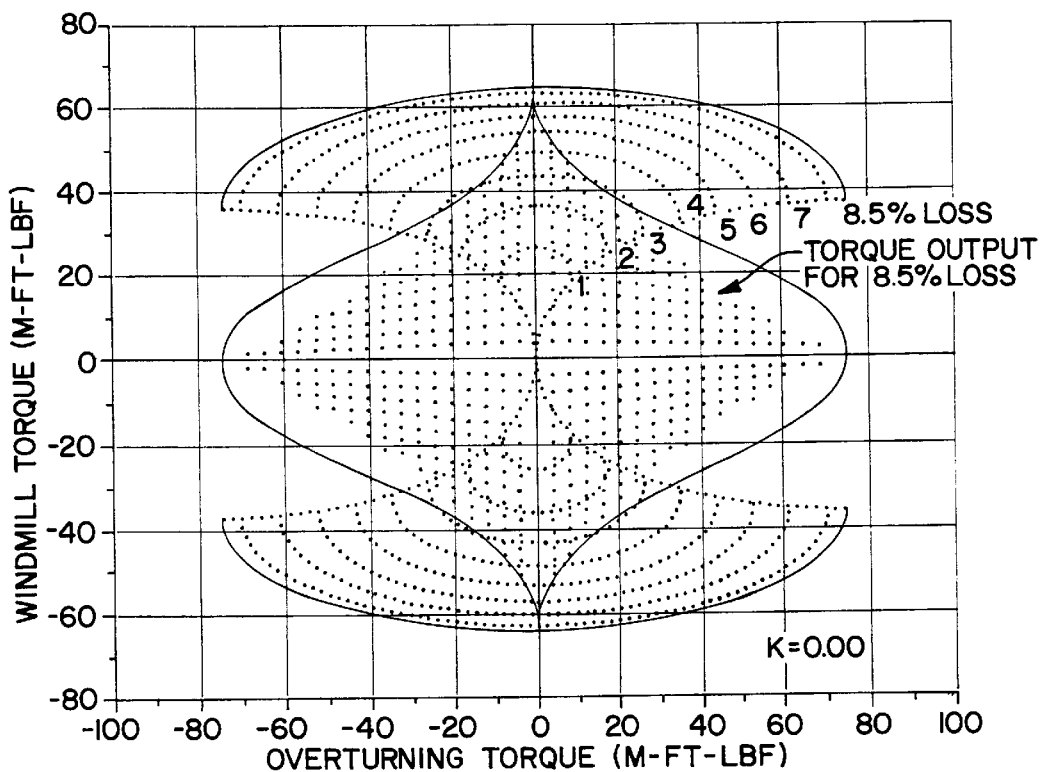
FIG. 4 shows the limits for an amplitude modulation algorithm when power loss levels are limited between 0–8.5%.

The next step is to determine whether the calculated torque combination is within the hourglass shape of FIGS. 3 and 5 by determining whether the magnitude of $T_w$ is less than the quantity $K_w \theta_s$. If it is, then this indicates the torque combination is outside the hourglass region and within the region best described as the hourglass neck. Torque combinations within this region require that the solar panels be tacked between two tack angle states. In FIG. 5, the two states needed to achieve point F are shown as points D and E. A flag named SplitCycle is set to true and the weighted parameter $\eta$ is calculated as described above. Before the solar panels are moved to their calculated tack angle positions, the sign of the requested overturning torque, $T_o$, is analyzed. If $T_o$ is less than zero, then the north tack angle, $\theta_n$, is set equal to negative $\theta_s$, the south tack angle, and then $\theta_s$ is set equal to zero. This is done to insure that the overturning torque produced has the proper sign since the algorithm assumes in the beginning that the overturning torque is positive. The algorithm sets Tnext, time of next algorithm operation, equal to $\eta$P and the panels are commanded to the proper tack angle positions. When the period of time Tnext has passed, the algorithm checks to see if the SplitCycle flag is set equal to true, and, if it is, resets Tnext to the value $(1-\eta)$P, sets the SplitCycle flag to false, reverses the sign on both tack angles, and commands the solar panels to the new tack angle positions.

Should the magnitude of $T_w$ be greater than the quantity $K_w \theta_s$, then that indicates the torque combination is within the hour glass shape and that only one set of tacking angles is needed. In this situation, the south and north solar panels are rotated by:

$$\theta_s = \frac{T_o K_w}{T_w K_o} + \frac{T_w}{2K_w} \; ; \theta_n = \frac{T_o K_w}{T_w K_o} - \frac{T_w}{2K_w},$$

for an amount of time P. In addition, the flag SplitCycle is set to false, indicating that tacking is not performed.

In summary, the present invention regards a time modulated tacking system and method which efficiently produces tacking torques with lower solar panel energy losses when compared with an amplitude modulated tacking system.

The foregoing description is provided to illustrate the invention, and is not to be construed as a limitation. Numerous additions, substitutions and other changes can be made to the invention without departing from its scope as set forth in the appended claims. For example, control of the tacking can be performed in either in a digital or an analog manner.

We claim:

1. A spacecraft traveling in a volume of space receiving radiation from the sun, comprising:

a solar panel;

a sensor measuring undesired forces exerted on said spacecraft and generating a signal representing said undesired forces;

an evaluator which receives said signal and calculates from said signal a torque to be applied to said spacecraft to compensate for said undesired forces;

a comparator generating a comparator signal indicative of whether said torque is within a predetermined range; and, a solar panel controller which receives said comparator signal, wherein (1) if said comparator signal indicates that said torque is within said predetermined range, then said torque is applied to said spacecraft by moving said solar panel to a position relative to said radiation for a fixed period P; and (2) if said comparator signal indicates that said torque is outside said predetermined range, then said torque is applied to said spacecraft by tacking said solar panel between at least two different positions relative to said received radiation during said fixed period P, said tacking of said solar panel being time modulated.

2. The spacecraft of claim 1, wherein said predetermined range is defined to be those torques which would produce a power loss below an acceptable level.

3. The spacecraft of claim 2 wherein the acceptable level is approximately 8.5%.

4. The spacecraft of claim 1, wherein said solar panel rotates relative to an axis of revolution.

5. The spacecraft of claim 1, comprising a second solar panel.

6. A method of compensating for an undesired force exerted on a spacecraft traveling in a volume of space, the spacecraft having a solar panel receiving radiation from the sun, said method comprising the steps of:

measuring the undesired force exerted on said spacecraft;

determining from the measured undesired force a torque to be applied to said spacecraft to compensate for said undesired force;

comparing said determined torque with a predetermined range;

if said torque is within said predetermined range, applying said determined torque to said spacecraft by moving said solar panel to a position relative to said radiation for a fixed period P;

if said torque is outside said predetermined range, applying said determined torque to said spacecraft by tacking said solar panel between at least two different positions relative to said received radiation during said fixed period P, said tacking of said solar panel being time modulated.

7. The method of claim 6, wherein said predetermined range is defined to be those torques which would produce a power loss below an acceptable level.

8. The method of claim 7 wherein the acceptable level is approximately 8.5%.

9. The method of claim 6, wherein movement of said solar panel is accomplished by rotating said solar panel relative to an axis of revolution.

10. The method of claim 6, wherein said spacecraft comprises a second solar panel which is not moved during said fixed period P, if said torque is outside said range.

11. A spacecraft traveling in a volume of space receiving radiation from the sun and encountering an undesired force, comprising:

a solar panel movably attached to said spacecraft;

a solar panel controller which controls the movement of said solar panel, wherein said controller moves said solar panel in a time modulated manner so that a torque is generated which compensates for said undesired force.

12. The spacecraft of claim 11, wherein said solar panel is rotatably attached to said spacecraft.

13. The spacecraft of claim 11, comprising:

a comparator determining whether a torque to compensate for said undesired force is within a predetermined range, wherein if said torque is outside said predetermined range, then said solar panel controller moves said solar panel with respect to said received radiation in said time modulated manner.

14. The spacecraft of claim 13, wherein said predetermined range is defined to be those torques which would produce a power loss below an acceptable level.

15. The spacecraft of claim 14 wherein the acceptable level is approximately 8.5%.

16. A method of compensating for an undesired force exerted on a spacecraft traveling in a volume of space which has a solar panel receiving radiation from the sun, said method comprising the steps of:

moving said solar panel relative to said spacecraft; and moving said solar panel in a time modulated manner so that a torque is generated which compensates for said undesired force.

17. The method of claim 16, wherein said solar panel rotates relative to said spacecraft.

18. The method of claim 16, comprising the step of:

determining whether a torque to compensate for said undesired force is within a predetermined range, wherein if said torque is outside said predetermined range, then said solar panel controller moves said solar panel with respect to said received radiation.

19. The method of claim 18, wherein said predetermined range is defined to be those torques which would produce a power loss below an acceptable level.

20. The method of claim 19 wherein the acceptable level is approximately 8.5%.

* * * * *